United States Patent
Wyman et al.

(10) Patent No.: US 11,034,891 B2
(45) Date of Patent: Jun. 15, 2021

(54) SYSTEMS AND METHODS FOR IMPROVING YIELDS OF HYDROCARBON FUELS FROM ALCOHOLS

(71) Applicant: VERTIMASS, LLC, Irvine, CA (US)

(72) Inventors: Charles E Wyman, Riverside, CA (US); John R Hannon, Salem, NH (US)

(73) Assignee: Vertimass, LLC, Irvine, CA (US)

( * ) Notice: Subject to any disclaimer, the term of this patent is extended or adjusted under 35 U.S.C. 154(b) by 26 days.

(21) Appl. No.: 16/089,306

(22) PCT Filed: Mar. 30, 2017

(86) PCT No.: PCT/US2017/025179
§ 371 (c)(1),
(2) Date: Sep. 27, 2018

(87) PCT Pub. No.: WO2017/173165
PCT Pub. Date: Oct. 5, 2017

(65) Prior Publication Data
US 2019/0119579 A1    Apr. 25, 2019

Related U.S. Application Data

(60) Provisional application No. 62/315,889, filed on Mar. 31, 2016.

(51) Int. Cl.
*C10G 3/00* (2006.01)
*B01J 8/00* (2006.01)
*B01J 8/02* (2006.01)

(52) U.S. Cl.
CPC .............. *C10G 3/60* (2013.01); *B01J 8/001* (2013.01); *B01J 8/0278* (2013.01); *B01J 8/0285* (2013.01);
(Continued)

(58) Field of Classification Search
CPC ....... C07C 1/20; C07C 2529/40; C07C 15/00; C10G 2400/02; C10G 3/49;
(Continued)

(56) References Cited

U.S. PATENT DOCUMENTS

| 4,404,414 A | * | 9/1983 | Penick ..................... C07C 1/20 585/315 |
| 4,523,046 A | | 6/1985 | Gould et al. |

(Continued)

FOREIGN PATENT DOCUMENTS

EP    2940103    11/2015

OTHER PUBLICATIONS

Costa et al, Ethanol to Gasoline Process: Effect of Variable, Mechanisms and Kinetics, Ind. Eng. Chem. Process Des. Dev., 1985, 24 (2), pp. 239-244.

(Continued)

*Primary Examiner* — Sharon Pregler
(74) *Attorney, Agent, or Firm* — Fish IP Law, LLP

(57) ABSTRACT

Systems and methods are provided that permit temperature control of a catalyst bed for conversion of alcohols to fuel hydrocarbons by modulating the water content of the alcohol feed stream provided to the catalyst bed. Heat generated by exothermic reactions in the catalyst bed can be utilized to pre-heat the alcohol feed stream. In some embodiments a secondary catalyst bed is provided for the conversion of light hydrocarbons found in the initial hydrocarbon product to fuel hydrocarbons that are liquid at ambient temperature and pressure.

7 Claims, 3 Drawing Sheets

(52) U.S. Cl.
CPC ............... *B01J 2208/00061* (2013.01); *B01J 2208/00548* (2013.01); *B01J 2208/00628* (2013.01); *B01J 2208/00725* (2013.01); *C10G 2300/1014* (2013.01); *C10G 2300/70* (2013.01); *Y02P 30/20* (2015.11)

(58) Field of Classification Search
CPC .... C10G 2300/4006; C10G 2300/4081; C10G 2300/802; C10G 2400/20; C10G 2400/30; C10G 3/54; B01J 2208/00203; B01J 2208/00283; B01J 2208/0053; B01J 8/0457; B01J 8/048; B01J 8/0488; B01J 8/0496; B01J 8/067
See application file for complete search history.

(56) References Cited

U.S. PATENT DOCUMENTS

| | | |
|---|---|---|
| 4,544,781 A | 10/1985 | Chao et al. |
| 4,621,164 A | 11/1986 | Chang et al. |
| 2004/0102641 A1 | 5/2004 | Furuya et al. |
| 2013/0072725 A1 | 3/2013 | Iijima |

OTHER PUBLICATIONS

PCT Search Report & Written Opinion dated Jul. 13, 2017 for PCT/US2017/025179 entitled Systems and Methods for Improving Yields of Hydrocarbon Fuels From Alcohols filed on Mar. 30, 2017 (Applicant: Vertimass, LLC).

* cited by examiner

SYSTEMS AND METHODS FOR IMPROVING YIELDS OF HYDROCARBON FUELS FROM ALCOHOLS

This application claims priority to U.S. Provisional Application No. 62/315,889 filed on Mar. 31, 2016. These and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

FIELD OF THE INVENTION

The field of the invention is catalytic processes for conversions of alcohols to hydrocarbons, particularly high molecular weight hydrocarbons.

BACKGROUND

The background description includes information that may be useful in understanding the present invention. It is not an admission that any of the information provided herein is prior art or relevant to the presently claimed invention, or that any publication specifically or implicitly referenced is prior art.

Ethanol is currently receiving a great deal of interest as a renewable source of alternative transport fuel, with over 23 billion gallons (87 billion liters) of ethanol produced for fuel purposes in 2014 worldwide. Ethanol is typically derived via a fermentation process (for example, corn ethanol fermentations) and then concentrated via distillation and molecular sieves to produce a fuel grade product. Unfortunately, the formation of ethanol/water azeotropes for which the composition of the liquid and vapor are identical complicates recovery of high purity ethanol. As a result, removal of ethanol from fermentation broths to produce high purity ethanol suitable for use as a fuel or in fuel mixtures frequently requires processing through energy-intensive distillation steps that include application of energy-intensive processes that specifically remove water from azeotropic mixtures. These additional steps significantly impact the costs of producing fuel-grade ethanol, lower potential greenhouse gas reductions, and cast doubts on the sustainability of ethanol as a renewable fuel.

There are a number of shortcomings to the use of ethanol as a fuel. For example, adaptation of internal combustion engines is necessary to permit them to use ethanol as a pure fuel. Another factor is that ethanol is not truly fungible with conventional hydrocarbon fuels. For example, current infrastructures do not support transportation of ethanol via pipelines, but rather using tanker trucks and trains. Ethanol also has two-thirds the energy density of gasoline, which results in up to 50% more ethanol being needed to travel the same distance as gasoline. Because of differences in the properties of gasoline and ethanol most current vehicles are not warranted to use ethanol/gasoline blends containing more than 10% ethanol, while the existing infrastructure is limited to using up to 85% ethanol in gasoline (i.e., E85 fuel blend). The lower energy density and hygroscopic nature of ethanol prevent its use in aircraft that look to maximize energy content per mass of fuel and minimize water retention in the fuel. In addition, ethanol is not well suited for use in diesel engines in heavy-duty vehicles.

Systems and methods that utilize catalytic reactions to convert ethanol into hydrocarbon mixtures have been proposed. Many of these processes, however, tend to favor the formation of low molecular weight hydrocarbons (i.e., having 4 or less carbons). Such low molecular weight hydrocarbons are gases under ambient conditions and are, as a result, difficult to handle and cannot be used directly as fuel in conventional automobile engines. In commercial operations production of these low molecular weight hydrocarbons is, therefore, significantly less desirable than that of high molecular weight hydrocarbons.

Systems and methods that can provide conversion of volatile alcohols to liquid fuel-grade hydrocarbons have been developed. For example, U.S. Pat. No. 4,058,756 (to Chang and Grover) describes a process that relies on two distinct and carefully controlled catalytic steps to first convert low molecular weight alcohols to ethers in a highly exothermic step, and then process the resulting ethers into hydrocarbon products suitable for use as liquid fuels. All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply. The overall process, however, is complex and relies on partial conversion of the alcohol and ether feedstreams to produce the desired hydrocarbon product mixture. In addition, the highly exothermic steps of such a process can introduce temperature control problems on scale-up.

In some catalytic processes for conversion of alcohols to fuel hydrocarbons, the buildup of heat generated by exothermic processes is controlled by dilution of the alcohol feedstock. Such an approach, however, directly impacts the throughput and/or capacity of the system. In other approaches, active removal of heat from the process is used. For example, EP Application Publication No. EP2940103A1 (to Jablonski et al) describes the use of a series of catalytic reactors with cooling steps between for catalytic processing of ethanol to biofuel. Similarly, U.S. Pat. No. 4,058,576 (to Chang and Grover) describes the use of a complex catalytic reactor design that integrates a heat exchanger and heat exchanging fluid to control temperature within a catalytic bed used for conversion of alcohols to fuel hydrocarbons. Such active cooling measures, however, add to the complexity of system design and to the operating costs of such systems. In addition, such active cooling approaches are not amenable to scale-up.

Thus, there remains a need for systems and methods that preferentially generate high molecular weight hydrocarbons from ethanol and/or other alcohols.

SUMMARY OF THE INVENTION

The inventive subject matter provides apparatus, systems and methods that provide a catalytic process for conversion of an alcohol (for for example, methanol, ethanol, or a propanol) to a liquid hydrocarbon fuel, in which water or a water-containing fluid is introduced into the alcohol feed stream in order to modulate the temperature of a catalyst bed. In some embodiments the alcohol feed stream can be pre-heated prior to introduction to the catalyst bed, either by transfer of heat from the catalyst bed or through the use of a dedicated heater. In some embodiments a controller is utilized in conjunction with a temperature sensor to control the addition of water to the alcohol feed stream, using a flow control device.

One embodiment of the inventive concept is a method for controlling temperature in a catalyst bed by providing a catalyst bed configured to process alcohol to a fuel hydrocarbon mixture, a first stream that includes the alcohol, and a second stream that is directed into the first stream and that includes water into the first stream to produce a mixed third stream that is directed to a catalyst bed. The flow of the alcohol stream and/or the water-containing stream is modulated to control or modulate water content of the mixed third stream to maintain temperature of the catalyst bed within a desired temperature range. In some embodiments temperature data that characterizes the temperature of the catalyst bed is generated and can be transmitted to a controller. Such a controller can utilize an algorithm to determine flow rate of the alcohol stream and/or the water-containing stream to maintain temperature of the catalyst bed within the desired range and transmit an instruction to a flow control device to modulate the flow of the alcohol stream and/or the water-containing stream. The mean temperature within a desired temperature range is from 200° C. to 600° C., and the mean temperature is surrounded by a temperature range selected from the group consisting of ±20° C., ±30° C., ±40° C., ±50° C., ±60° C., ±70° C., ±80° C., ±90° C., and ±100° C.

Another embodiment of the inventive concept is a method for controlling temperature in a catalyst bed that includes providing a catalyst bed that is configured to process an alcohol to a fuel hydrocarbon mixture, where the catalyst bed is at a first temperature. An alcohol stream is provided at a second temperature that is below the first temperature, and is divided into different flow paths that are directed to the catalyst bed. At least one flow path is heated to a third temperature using heat from the catalyst bed (e.g. by thermal contact). The flow of this heated alcohol stream is controlled to maintain temperature of the catalyst bed within a desired temperature range. In some embodiments the third temperature is within the desired temperature range. The desired temperature range typically has a mean temperature of 200° C. to 600° C., which is surrounded by a temperature range ±20° C., ±30° C., ±40° C., ±50° C., ±60° C., ±70° C., ±80° C., ±90° C., or ±100° C. In some embodiments the method includes the step of generating temperature data characterizing temperature of the catalyst bed, which is sent to a controller. The controller utilizes an algorithm to determine flow rate one or more of the flow paths necessary to maintain temperature of the catalyst bed within a desired range and transmits an instruction to a flow control device to modulate flow rate of one or more of the flow paths.

Another embodiment of the inventive concept is a method for modifying product distribution in the conversion of alcohol to fuel hydrocarbons. In such a method a primary catalyst bed is provided that includes a catalyst configured to convert alcohol into a hydrocarbon mixture that includes fuel hydrocarbons and light paraffins. A secondary catalyst bed is also provided that includes a second catalyst configured to convert light paraffins into fuel hydrocarbons. In such a method a flow of alcohol is directed to the primary catalyst bed to produce the hydrocarbon mixture. The light paraffins are separated from the resulting hydrocarbon mixture, and at least a portion of the light paraffins are directed to the secondary catalyst bed to generate additional fuel hydrocarbons. In some embodiments the primary catalyst bed and the secondary catalyst bed are housed in a single catalytic reactor, in other embodiments they are housed in separate and distinct catalytic reactors. In some embodiments part of the flow of light paraffins is used as fuel for heating the flow of alcohol to the primary catalyst bed. The primary catalyst bed is preferably maintained at a mean temperature of 200° C. to 600° C., where the mean temperature is surrounded by a temperature range of ±20° C., ±30° C., ±40° C., ±50° C., ±60° C., ±70° C., ±80° C., ±90° C., or ±100° C. The secondary catalyst bed is preferably maintained at a higher temperature than the primary catalyst bed, exceeding the mean temperature of the primary catalyst bed by at least 5° C. to 50° C. or higher. This can be accomplished by transferring at least a portion of heat generated by converting alcohol into the hydrocarbon mixture to the secondary catalyst bed, or by contacting the secondary catalyst bed with a hydrocarbon product produced by the primary catalyst bed that is at an elevated temperature relative to the primary catalyst bed.

Another embodiment of the inventive concept is a system for controlling temperature in a catalyst bed. Such a system includes a catalyst bed configured to process alcohol to a fuel hydrocarbon mixture, where the catalyst bed is provided with a flow of an alcohol feed stream and with a flow of a water-containing stream that is fluidically connected to the alcohol feed stream to produce a mixed stream. The mixed stream is directed to the catalyst bed. Such a system also includes a control system configured to modulate the flow of the alcohol feed stream and/or the water-containing stream to modulate water content of the mixed stream, thereby maintaining temperature of the catalyst bed within a desired temperature range. Such a system can include a temperature sensor that is in thermal communication with the catalyst bed. The control system can include a controller that is in communication with the temperature sensor and a flow control device, and can utilize an algorithm to determine flow rate of the flow of the alcohol feed stream or the water-containing stream as necessary to maintain temperature of the catalyst bed within the desired range. The desired temperature range of the catalyst bed is preferably from 200° C. to 600° C.

Another embodiment of the inventive concept is a system for controlling temperature in a catalyst bed. Such a system includes a catalyst bed configured to process alcohol to a fuel hydrocarbon mixture, where the catalyst bed is at a first temperature. The system also includes a flow of an alcohol stream at a second temperature that is below the first temperature. This flow is divided into a first flow path and a second flow path, which are directed to the catalyst bed. The second flow path is heated to a third temperature by thermal contact with the catalyst bed and is directed to the catalyst bed. The system includes a control system that modulates flow through the second flow path to maintain temperature of the catalyst bed within a desired temperature range. In some embodiments the third temperature is within this desired temperature range, which has a mean temperature of from 200° C. to 600° C. (wherein the mean temperature is surrounded by a temperature range of ±20° C., ±30° C., ±40° C., ±50° C., ±60° C., ±70° C., ±80° C., ±90° C., or ±100° C.). Such a system can include a temperature sensor that is in thermal communication with the catalyst bed, and can include a controller that is in communication the temperature sensor and a flow control device. The controller utilizes an algorithm to determine a flow rate of the first flow and/or the second flow as necessary to maintain temperature of the catalyst bed within the desired range.

Another embodiment of the inventive concept is a system for modifying product distribution in the conversion of alcohol to fuel hydrocarbons. Such a system includes a primary catalyst bed, which includes a first catalyst configured to convert alcohol into a hydrocarbon mixture. This hydrocarbon mixture includes fuel hydrocarbons and light paraffins. The system also includes a secondary catalyst bed that includes a second catalyst configure to convert light paraffins into fuel hydrocarbons. The secondary catalyst bed is in fluid communication with the primary catalyst bed. In such a system the primary catalyst bed and the secondary catalyst bed can be housed in a single catalytic reactor, or in separate and distinct catalytic reactors. In some embodiments a portion of the light paraffins are utilized as fuel for heating a flow of alcohol that is directed to the primary catalyst bed. In such systems the primary catalyst bed is preferably maintained at a mean temperature within a desired temperature range of from 200° C. to 600° C., where the mean temperature is surrounded by a temperature range of ±20° C., ±30° C., ±40° C., ±50° C., ±60° C., ±70° C., ±80° C., ±90° C., or ±100° C. The secondary catalyst bed is preferably maintained at an elevated temperature that exceeds the mean temperature of the primary catalyst bed by at least 5° C. At least a portion of heat generated by exothermic reaction of the primary catalyst bed can be transferred to the secondary catalyst bed, for example by a flow of at least part of an initial hydrocarbon product having a higher temperature than the primary catalyst bed from the primary catalyst bed to at least a portion of the secondary catalyst bed.

33. The system of claim 31, wherein the primary catalyst bed is configured to produce an initial hydrocarbon product at a second elevated temperature, wherein the second elevated temperature is greater than the mean temperature, and further comprising a fluid transfer device configured to direct at least a portion of the initial hydrocarbon product into contact with at least a portion of the secondary catalyst bed.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

In FIG. 2A a dedicated heater is provided that is in thermal contact with the alcohol feedstream. In FIG. 2B a portion of the feedstream is brought into thermal contact with the catalyst bed, thereby cooling the catalyst bed and warming the alcohol feedstream.

DETAILED DESCRIPTION

Figure 1:
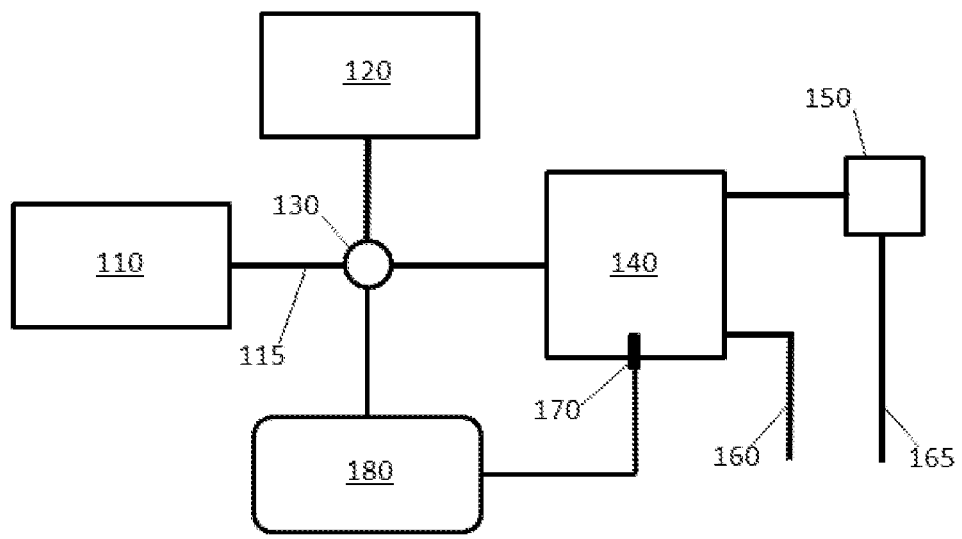
FIG. 1 schematically depicts a system of the inventive concept, in which water or a water-containing fluid is added to an alcohol feedstream of a catalytic process for conversion of alcohol to liquid fuel hydrocarbons in order to modulate the temperature of a catalyst bed.

The following description includes information that may be useful in understanding the present invention. It is not an admission that any of the information provided herein is prior art or relevant to the presently claimed invention, or that any publication specifically or implicitly referenced is prior art.

The inventive subject matter provides apparatus, systems and methods in which a alcohols are preferentially converted into high molecular weight (i.e., C5 or greater) hydrocarbons (i.e., those that are liquid at ambient conditions) using zeolite catalysts with metals other than aluminum substituted into a ZSM-5 catalyst structure. Such reactions are mildly exothermic, which can result in catalyst temperatures that are outside of the optimal range for formation of fuel hydrocarbon species during operation, with light paraffin content increasing as temperatures increase. This problem is exacerbated by scale up of the process.

Surprisingly, Inventors have found that catalyst temperature can be controlled by controlling the water content of the alcohol supplied to the catalytic reactor. For example, water content of the alcohol supplied to the catalytic reactor can be increased in order to maintain or reduce the temperature of the catalyst bed. Inventors have also found that residual light paraffins from such processes can be converted to desirable fuel hydrocarbon species using a secondary catalyst bed containing a gallium zeolite catalyst. Such a secondary catalyst bed can be provided within a primary reactor that also contains a primary catalyst bed utilized for alcohol conversion, or can be contained in a secondary reactor. In some embodiments the secondary catalyst bed is operated at a different (for example, elevated) temperature than that of the primary catalyst bed.

One should appreciate that the disclosed techniques provide many advantageous technical effects including preferential production of high molecular weight hydrocarbons from ethanol and other renewable alcohol sources, thereby providing a source of readily transportable, carbon-neutral automotive fuel by a readily scalable process.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

Zeolite catalysts are widely used in a variety of industrial scale organic synthetic reactions. Notably, as shown in Costa et al (Ind. Eng. Chem/Process Des. Dev. 24:239-244 (1985)), ZSM-5 zeolite catalyst has been used to convert ethanol into a mixture of low and high molecular weight hydrocarbons. All publications herein are incorporated by reference to the same extent as if each individual publication or patent application was specifically and individually indicated to be incorporated by reference. Where a definition or use of a term in an incorporated reference is inconsistent or contrary to the definition of that term provided herein, the definition of that term provided herein applies and the definition of that term in the reference does not apply. Costa et al also found that the distribution of reaction products could be changed by altering the pressure or the temperature of the catalytic reaction. This process is not commercially viable; however, as ethanol had to be provided at 96% or greater purity in order to avoid rapid and irreversible loss of activity in the ZSM-5 catalyst.

In embodiments of the current concept zeolite catalysts containing active metals other than aluminum are utilized in the conversion of alcohol (such as methanol, ethanol, propanol, and/or butanol) into hydrocarbon product mixtures with a high proportion of high molecular weight hydrocarbons. The alcohols utilized as raw materials are preferably obtained from biological sources, for example as a result of fermentation. Such alcohols can be provided in concentrations of at least 5%, 10%, 20%, 30%, 40%, 50%, 60%, 70%, 80%, 90%, 95%, or greater than 95% by weight. The remaining portion of the raw material can include water. Alcohols can be supplied to the catalyst as a liquid, a vapor, or a mixture of vapor and liquid. In some embodiments the alcohol raw material is pre-heated to the operating temperature of the catalyst prior to application. In other embodiments the alcohol raw material can be pre-heated to a temperature intermediate between that of the catalyst and ambient temperature prior to introduction to the catalyst. Alcohol raw material can be supplied to the catalyst from a single source, or can be supplied from multiple sources to a single catalyst bed or device.

Catalysts utilized in processes of the inventive concept can be zeolite catalysts. The zeolite material is completely or substantially microporous. By being completely or substantially microporous, the pore volume due to micropores (i.e. pores having a mean diameter of 2 nm or less) can be, for example, 100%, or at least 95%, 96%, 97%, 98%, 99%, or 99.5%, with the remaining pore volume being due to mesopores (i.e. pores having a mean diameter between about 2 nm and about 50 nm), or in some embodiments, macropores (i.e. pores having a mean diameter greater than about 50 nm). In other embodiments, the zeolite material is completely or substantially mesoporous. By being completely or substantially mesoporous, the pore volume due to mesopores can be, for example, 100%, or at least 95%, 96%, 97%, 98%, 99%, or 99.5%, with the remaining pore volume being due to micropores, or in some embodiments, macropores. In yet other embodiments, the zeolite material contains an abundance of both micropores and mesopores. By containing an abundance of both micropores and mesopores, the pore volume due to mesopores can be, for example, up to, at least, or precisely 50%, 60%, 70%, 80%, or 90%, with the pore volume balance being due to mesopores, or vice-versa.

Various forms of zeolite are commonly known by respective abbreviations such as, for example, ABW, ACO, AEI, AEN, AFG, AFN, AFT, AFX, APC, APD, ATN, ATT, ATV, AWO, AWW, BCT, BIK, BOF, BRE, CAS, CDO, CHA, DFT, DOH, EAB, EPI, ERI, ESV, FAR, FRA, GIS, GIU, IHW, ITE, ITW, JBW, JRY, KFI, LAU, LEV, LIO, LOS, LTA, LTN, MAR, MON, MTF, MWW, NAT, NSI, OWE, PAU, PHI, RHO, RTE, RTH, RWR, SAS, SAT, SAY, SBN, SIV, SOD, STI, STT, THO, TOL, UEI, UFI, or ZON. Some particular examples of zeolites include the chabazite class of zeolites (for example, SSZ-13, SSZ-62, Phi, SAPO-34, LZ-218, and Linde D). In some embodiments, the zeolite is a MFI-type zeolite, MEL-type zeolite, MTW-type zeolite, MCM-type zeolite, BEA-type zeolite, kaolin, or a faujasite-type of zeolite.

Preferred zeolites include the ZSM class of zeolites (e.g., ZSM-5, ZSM-8, ZSM-11, ZSM-12, ZSM-15, ZSM-23, ZSM-35, ZSM-38, ZSM-48), zeolite X, zeolite Y, zeolite beta, and the MCM class of zeolites (e.g., MCM-22 25 and MCM-49). In other embodiments of the inventive concept, the zeolite is SSZ-13, which belongs to the ABC-6 family of zeolites, all of which are also considered herein. Typical SSZ-13 zeolites are represented by the formula $RN_aNa_bAl_2.4Si_{33.6}O_{72}.wH_2O$, where $(1.4<a<27)$, $(0.7<b<4.3)$, and $(1<w<7)$, and where RN is N,N,N-1-trimethyladamantammonium.

The zeolite can have any suitable silica-to-alumina (i.e., $SiO_2/Al_2O_3$ or "Si/Al") ratio. For example, in various embodiments, the zeolite can have a Si/Al ratio of precisely, at least, less than, or up to 1, 2, 3, 4, 5, 6, 7, 8, 9, 10, 11, 12, 13, 14, 15, 20, 25, 30, 35, 40, 45, 50, 55, 60, 65, 70, 75, 80, 85, 90, 95, 100, 120, 150, or 200, or a Si/Al ratio within a range bounded by any two of the foregoing values. In particular embodiments, the zeolite possesses a Si/Al ratio of 1 to 45.

In embodiments of the inventive concept, the zeolite includes an amount of cationic or metallic species other than aluminum. As is well known in the art, the amount of cationic species is generally proportional to the amount of aluminum in the zeolite. This is because the replacement of silicon atoms with lower valence aluminum atoms necessitates the presence of countercations to establish a charge balance. Some examples of cationic species include alkali metal ions, alkaline earth metal ions, and main group metal ions. Some examples of alkali metal ions that may be included in the zeolite include lithium (Li+), sodium (Na+), potassium (K+), rubidium (Rb+), and/or cesium (Cs+). Some examples of alkaline earth metal ions that may be included in the zeolite include (Be$^{2+}$), magnesium (Mg$^{2+}$), calcium (Ca$^{2+}$), strontium (Sr$^{2+}$), and/or barium (Ba$^{2+}$).

Some examples of main group metal ions that may be included in the zeolite include boron ($B^{3+}$), gallium ($Ga^{3+}$), indium ($In^{3+}$), and/or arsenic ($As^{3+}$). Polyvalent cations, for example $Cu^{1+}$ and/or $Cu^{2+}$ can also be included. In some embodiments, a combination of cationic species is included. The cationic species can be in a trace amount (e.g., no more than 0.01% or 0.001%), or alternatively, in a significant amount (e.g., above 0.01%, and up to, for example, 0.1%, 0.5%, 1%, 2%, 3%, 4%, 5%, or more than 5% by weight of the zeolite).

In addition to copper ions, the zeolite catalyst of the instant invention can also include at least one trivalent metal ion. As used herein, the term "trivalent metal ion" is defined as a trivalent metal ion other than aluminum ($Al^{+3}$). Without wishing to be bound by theory, it is believed that the trivalent metal is incorporated into the zeolite material by replacing an amount of aluminum ions therein. This provides a zeolite catalyst that is both chemically and structurally distinct from conventional zeolite catalysts where this structural substitution does not occur. In addition, the incorporated trivalent metal ion is believed to be bound in the zeolite to an appropriate number of oxygen atoms, i.e., as a metal oxide unit in close proximity (e.g., within electronic contact or communication) to metal cations that form charge complexes with the zeolite catalyst (as described above). The close proximity between the trivalent metal ions and ionically bound ions is believed to cause a combined effect different than the cumulative effect of these ions when they are not in such close proximity.

In some embodiments, only one type of trivalent metal ion aside from aluminum is incorporated into the zeolite. In other embodiments, at least two types of trivalent metal ions aside from aluminum are incorporated into the zeolite. In yet other embodiments, at least three types of trivalent metal ions aside from aluminum are incorporated into the zeolite. In yet other embodiments, precisely two or precisely three types of trivalent metal ions aside from aluminum are incorporated into the zeolite.

Each of the trivalent metal ions can be included in any suitable amount, such as, precisely, at least, less than, or up to, for example, 0.01%, 0.02%, 0.03%, 0.04%, 0.05%, 0.06%, 0.07%, 0.08%, 0.09%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, or 2.5%, or an amount within a range bounded by any two of the foregoing values. In particular embodiments, each of the trivalent metal ions can be included in an amount of, precisely, at least, less than, or up to 2.5%. In embodiments where more than one type of trivalent metal ion is included, the loading of each metal can be independently selected from any of the above exemplary amounts or ranges therein. In other embodiments, the total amount of trivalent metal ions other than aluminum conforms to any of the exemplary values provided above.

In some embodiments, at least one trivalent metal ion is selected from trivalent transition metal ions. The one or more transition metals can be selected from any or a select portion of the following types of transition metals: elements of Groups IIIB (Sc group), IVB (Ti group), VB (V group), VIB (Cr group), VIIB (Mn group), VIIIB (Fe and Co groups) of the Periodic Table of the Elements. Some examples of trivalent transition metal ions include $Sc^{+3}$, $Y^{+3}$, $V^{+3}$, $Nb^{+3}$, $Cr^{+3}$, $Fe^{+3}$, and $Co^{+3}$. In other embodiments, the trivalent metal ion excludes all transition metal ions, or alternatively, excludes any one, two, or more classes or specific examples of transition metal ions provided above. In particular embodiments, the trivalent transition metal ions include $Sc+3$, or $Fe+3$, or a combination thereof.

In other embodiments, at least one trivalent metal select portion of elements of Group IIIA (B group) and/or Group VA (N group) of the Periodic Table, other than aluminum. Some examples of trivalent main group metal ions include $Ga^{+3}$, $In^{+3}$, $As^{+3}$, $Sb^{+3}$, and $Bi^{+3}$. In other embodiments, the trivalent metal ion excludes all main group metal ions other than aluminum, or alternatively, excludes any one, two, or more classes or specific examples of main group metal ions provided above. In particular embodiments, the trivalent main group metal ions include at least $In^{+3}$.

In other embodiments, at least one trivalent metal ion is selected from trivalent lanthanide metal ions. Some examples of trivalent lanthanide metal ions considered herein include $La+3$, $Ce^{+3}$, $Pr^{+3}$, $Nd^{+3}$, $Sm^{+3}$, $Eu^{+3}$, $Gd^{+3}$, $Tb^{+3}$, $Dy^{+3}$, $Ho^{+3}$, $Er^{+3}$, $Tm^{+3}$, $Yb^{+3}$, and $Lu^{+3}$. In particular embodiments, the trivalent lanthanide metal ion is selected from one or a combination of $La^{+3}$, $Ce^{+3}$, $Pr^{+3}$, and $Nd^{+3}$. In further particular embodiments, the trivalent lanthanide metal ion is or includes $La^{+3}$.

In other embodiments, at least two trivalent metal ions are selected from trivalent transition metal ions. Some combinations of trivalent transition metal ions considered herein include $Sc^{+3}$ in combination with one or more other trivalent transition metal ions, or $Fe^{+3}$ in combination with one or more other trivalent transition metal ions, or y+3 in combination with one or more other trivalent transition metal ions.

In other embodiments, at least two trivalent metal ions are selected from trivalent main group metal ions. Some combinations of trivalent main group metal ions considered herein include $In^{+3}$ in combination with one or more other trivalent main group metal ions, or $Ga^{+3}$ in combination with one or more other trivalent main group metal ions, or $As^{+3}$ in combination with one or more other trivalent main group metal ions.

In other embodiments, at least two trivalent metal ions are selected from trivalent lanthanide metal ions. Some combinations of trivalent lanthanide metal ions considered herein include $La^{+3}$ in combination with one or more other trivalent lanthanide metal ions, or $Ce^{+3}$ in combination with one or more other trivalent lanthanide metal ions, or $Pr^{+3}$ in combination with one or more other trivalent lanthanide metal ions, or $Nd^{+3}$ in combination with one or more other trivalent lanthanide metal ions.

In other embodiments, at least one trivalent metal ion is a trivalent transition metal ion and at least one trivalent metal ion is a trivalent lanthanide metal ion. For example, in particular embodiments, at least one trivalent metal ion is selected from $Sc^{+3}$, $Fe^{+3}$, and/or $Y^{+3}$, and another trivalent metal ion is selected from $La^{+3}$, $Ce^{+3}$, $Pr^{+3}$, and/or $Nd^{+3}$.

In other embodiments, at least one trivalent metal ion is a trivalent transition metal ion and at least one trivalent metal ion is a trivalent main group metal ion. For example, in particular embodiments, at least one trivalent metal ion is selected from $Sc^{+3}$, $Fe^{+3}$, and/or $Y^{+3}$, and another trivalent metal ion is selected from $In^{+3}$, $Ga^{+3}$, and/or $In^{+3}$.

In other embodiments, at least one trivalent metal ion is a trivalent main group metal ion and at least one trivalent metal ion is a trivalent lanthanide metal ion. For example, in particular embodiments, at least one trivalent metal ion is selected from $Sc^{+3}$, $Fe^{+3}$, and/or $Y^{+3}$, and another trivalent metal ion is selected from $La^{+3}$, $Ce^{+3}$, $Pr^{+3}$, and/or $Nd^{+3}$.

In other embodiments, at least three trivalent metal ions are included in the zeolite. The at least three trivalent metal ions can be selected from trivalent transition metal ions, trivalent main group metal ions, and/or trivalent lanthanide metal ions.

In particular embodiments, one, two, three, or more trivalent metal ions are selected from $Sc^{+3}$, $Fe^{+3}$, $Y^{+3}$, $La^{+3}$, $Ce^{+3}$, $Pr^{+3}$, $Nd^{+3}$, $In^{+3}$, and/or $Ga^{+3}$. In more particular embodiments, one, two, three, or more trivalent metal ions are selected from $Sc^{+3}$, $Fe^{+3}$, $La^{+3}$, and/or $In^{+3}$.

The zeolite catalyst described above is typically not coated with a metal-containing film or layer. However, in some embodiments of the inventive concept the zeolite catalyst described above can be coated with a metal-containing film or layer as long as the film or layer does not substantially impede the catalyst from effectively functioning as an alcohol dehydration catalyst as intended herein. By being coated, the film or layer resides on the surface of the zeolite. In some embodiments, the surface of the zeolite refers to only the outer surface (i.e., as defined by the outer contour area of the zeolite catalyst), while in other embodiments, the surface of the zeolite refers to or includes inner surfaces of the zeolite, such as the surfaces within pores or channels of the zeolite. The metal-containing film or layer can serve, for example, to adjust the physical characteristics of the catalyst, the catalytic efficiency, or catalytic selectivity. Some examples of metal-containing surfaces include the oxides and/or sulfides of the alkali metals, alkaline earth metals, divalent transition or main group metals (e.g., $Zn^{+2}$, $Fe^{+2}$, $Co^{+2}$, $Ni^{+2}$, $Pd^{+2}$, $Pt^{+2}$, $Sn^{+2}$, or $Pb^{+2}$), tetravalent transition metals (e.g., $Ti^{+4}$, $Zr^{+4}$, $Rh^{+4}$, $Ir^{+4}$, $Mn^{+4}$, $Ge^{+4}$, $Sn^{+4}$, and $Te^{+4}$), pentavalent transition or main group metals (e.g., $Nb^{+5}$, $Ta^{+5}$, and $Sb^{+5}$), and hexavalent transition metals (e.g., $Cr^{+6}$, $Mo^{+6}$, and $W^{+6}$). In other embodiments, one or more classes or specific types of any of the above additional metal ions are excluded from the zeolite catalyst.

Inventors have found that the catalysts described above have particular utility in the conversion of alcohols to hydrocarbons (such as paraffins and olefins). Suitable alcohols include methanol, ethanol, propanol, butanol, and pentanol. In preferred embodiments such alcohols are a result of processes performed using renewable resources. Examples of suitable renewable resources include grains (such as corn, rice, and wheat), biomass (such as waste products from grain and/or wood processing), cellulosic waste, and /or municipal waste. In other embodiments, alcohols can be derived from plentiful fossil hydrocarbon sources (for example natural gas). Alcohols can be derived from a single source (for example, fermentation of corn), or can be derived from multiple sources Alcohols can be provided as a raw material in the form of a mixture with other compounds, such as water. In such mixtures alcohols can represent 5%, 10%, 20%, 30%, 40%, 50%, 60%, 70%, 80%, 90%, 95%, or more of the content by volume. While water does not have an impact on the activity of the catalyst, for economic reasons it can be desirable to utilize raw material having an alcohol content of at least 50%. The Applicants have found that, surprisingly, the water content of an alcohol feedstream can be utilized and/or manipulated to control temperature within a catalyst bed used for fuel hydrocarbon production. It should be appreciated that such manipulation of water content provides a readily scalable solution to the problem of temperature control of such exothermic processes, and does so without significantly increasing system complexity or operating costs.

Raw material containing alcohol can be provided to the catalyst as a gas (e.g. a vapor), a liquid, or as a gas/liquid mixture. In some embodiments the raw material is heated prior to introduction to the catalyst. In such embodiments the raw material can be heated to the operating temperature of the catalyst prior to introduction. In other embodiments of the inventive concept the raw material is heated to a temperature that is intermediate between ambient temperature and the operating temperature of the catalyst prior to introduction.

Dehydration of alcohols by the catalyst and subsequent reactions typically produce a mixture of paraffin and olefin products over a range of molecular weights. Low molecular weight hydrocarbons (i.e. C2-C4 hydrocarbons) are typically gases at ambient conditions, whereas high molecular weight hydrocarbons (i.e. C5 or greater) can be liquid at ambient or approximately ambient conditions. In the production of hydrocarbons from ethanol that are intended for use as fuels (for example, as replacements for gasoline, diesel, and aviation fuel) it is desirable to increase the yield of high molecular weight hydrocarbon species that are liquid at ambient conditions.

Inventors have found that optimal conversion of ethanol to desirable fuel hydrocarbon species using a particular catalyst occurs over a restricted temperature range, which varies depending on the composition of the catalyst used. Such temperature ranges are typically centered around temperatures ranging from 200° C. to 600° C., and can have optimal operating ranges of ±20° C., ±30° C., ±40° C., ±50° C., ±60° C., ±70° C., ±80° C., ±90° C., ±100° C. or more. For example, a suitable temperature range for such a process can be 350° C. to 420° C. A catalyst bed temperature exceeding this restricted temperature range can result in an undesirable distribution of hydrocarbon products, typically resulting in excess production of light paraffins that are too volatile for use as liquid commercial fuels.

The overall reaction in conversion of ethanol to fuel hydrocarbon species, however, is exothermic. The amount of heat produced is at least partially dependent on the nature of the catalyst used and/or the hydrocarbon distribution produced, and typically ranges from about 0.01 MJ/kg ethanol to 20 MJ/kg ethanol. For example, a typical amount of heat energy produced during conversion of ethanol to fuel hydrocarbons can be about 0.9 MJ/kg ethanol. The exothermic nature of the reaction causes the catalyst bed to generate heat during the reaction and resulting in an undesirable increase in temperature. This effect can be exacerbated by decreasing surface area to volume ratios on scale up of the process, which reduces the passive heat loss.

One approach to mitigating this effect is to dilute the gas phase ethanol entering the catalytic reactor with a carrier gas such as helium and/or nitrogen. Such an approach, however, necessarily entails the use of relative expensive carrier gases, and directly impacts throughput.

As noted above, Inventors have found that the temperature of the catalyst bed in such reactions can be reduced by increasing the water content of the alcohol feedstream. This can be accomplished by the addition of small volumes of water or water-containing fluid that do produce significant (e.g. greater than 1%, 3%, 5%, 8%, 10%, 15%, 20%, or more than 20% by volume) dilution of the alcohol feedstream. In one embodiment of the inventive concept, a supply of water, aqueous solution containing at least 5%, 10%, 15%, 20%, 25%, 30%, 35%, 40%, 45%, 50%, 60%, 70%, 80%, 90%, or more than 90% water by volume, water vapor, and/or a gas containing at least 5%, 10%, 15%, 20%, 25%, 30%, 35%, 40%, 45%, 50%, 60%, 70%, 80%, 90%, or more than 90% water vapor by volume is fluidically connected (for example, using a T connection) to a supply of alcohol raw material, where the fluidic connection is upstream of a catalytic reactor utilized for conversion to fuel hydrocarbons. In a preferred embodiment, the alcohol (e.g. ethanol) content of the feed stream is between about 10% and about 12% by volume after the point of fluidic connection with the water or water-containing fluid source. Such a connection can include a flow control device (for example, a dosing pump and/or controllable valve) positioned to control the flow of water or water-containing fluid to the alcohol raw material prior to exposure to the catalyst bed.

In some embodiments the catalytic reactor includes one or more temperature sensors that provide data related to the temperature of the catalytic reactor and/or catalyst bed. Such a temperature sensor can gather temperature data from the catalyst bed (for example, using an imbedded temperature sensor and/or suitably positioned infrared camera) or can gather temperature data from a product stream. Such data can be transmitted to a controller, which is connected to and in control of the flow control device. In such an embodiment an algorithm can be employed by the controller to maintain the temperature of the catalyst bed within a desired temperature range (as described above), increasing the flow of water vapor into the alcohol raw material (thereby increasing its water content) to decrease the temperature and decreasing the flow of water vapor into the alcohol raw material (thereby decreasing its water content) to increase the temperature. Such an algorithm can, for example, incorporate constants derived from temperature/water content studies using similar or identical catalyst compositions in a formula to generate a desired water content, and to generate instructions to the flow controller. Alternatively, such an algorithm can incorporate a feedback loop that adjusts the flow of water or water-containing fluid in response to deviation from a stored optimal temperature value or range of values (e.g. increasing flow when the temperature exceeds a setpoint, decreasing flow when the temperature falls below a setpoint). In other embodiments such data can be displayed or otherwise provided to an operator who can make manual adjustments to the flow control device. Alternatively, the flow of a water vapor stream or stream of gas containing water vapor into the alcohol raw material stream can be kept constant while the water content of the water vapor containing stream is varied. In some embodiments the controller can perform in a semi-automated fashion, providing warnings of deviations from the desired temperature or temperature range and recommending actions to an operator.

In some embodiments the temperature of the catalyst bed can be controlled by bringing at least a portion of the alcohol feedstream into thermal contact with the catalyst bed. Absorption of heat by the alcohol feedstream provides both cooling of the alcohol bed and advantageously pre-heats the alcohol feedstream. Such an approach can be used in conjunction with control of the water content of the alcohol feedstream, as described above.

In such embodiments of the inventive concept the flow of alcohol raw material can be split into two or more streams prior to entering the catalytic reactor. At least one of these streams of alcohol raw material can be heated to operating or near operating temperatures before entering the catalytic reactor. One or more other streams of alcohol raw material can be left unheated, but rather directed through passages or flow channels that are in thermal contact with the catalyst bed, thereby transferring heat from the catalyst bed to the stream of alcohol raw material. Alternatively, heat transfer can be provided using a heat exchanger, heat pipe, or other suitable heat transfer device. This stream of heated alcohol raw material can be re-joined with other streams of alcohol raw material that are directed towards the catalytic reactor. As described above, the catalytic reactor can include temperature sensors that permit monitoring of the temperature of the catalyst bed, and the flow rate of relatively cool alcohol raw material can be modulated to control the amount of heat transferred to the alcohol raw material in order to control the temperature of the catalyst bed.

As noted above, light hydrocarbons (for example, C2 to C4 hydrocarbons such as ethylene, ethane, propene, propane, isobutane, 2-butene, butane, and isobutylene) can be produced by the above described catalytic processes. Such light hydrocarbons, being highly volatile at ambient conditions, are not suitable for use as fuel hydrocarbons. In systems and methods of the inventive concept at least a portion of these light hydrocarbons can be separated from fuel hydrocarbon products (for example, in a phase separator) and utilized in other parts of the process. For example, light hydrocarbons removed from the products of the catalytic reactor can be used as fuel for heating a stream of alcohol raw material prior to entering the catalytic reactor, and/or to provide preliminary heating of the catalyst bed prior to use. Such uses, however, may not utilize all of the light hydrocarbons produced, particularly when such reactions are carried out on a large scale.

The Inventors have found that some light hydrocarbon species (for example, olefins) can be added to an alcohol feed being supplied to a V-ZSM-catalyst for conversion to liquid hydrocarbons (i.e. C5+ hydrocarbons). Other species (for examples alkanes), however, were not found to be readily converted into liquid hydrocarbons, despite the use of a broad range of operating temperatures with a V-SMV-5 catalyst bed. Surprisingly, Inventors have found that such light alkanes can be converted to liquid hydrocarbons using other catalyst formulations, for example Ga-ZSM-5.

For example, a simulated light hydrocarbon gas mixture of ethylene (6%), propene (3%), propane (3%), isobutene (1000 ppm), cis-2-butene (2%), isobutylene (1.4%), with the remaining balance being $N_2$, was treated with a small amount (app. 0.2 g) Ga-ZSM-5 (prepared by an ion-exchange method) in a fixed bed reactor operated at ambient pressure. Product distributions produced by treatment at different temperatures are shown in Table 1.

TABLE 1

Light gas mixture conversion with 0.2 g Ga-ZSM-5 (6.8% Ga loading), 10 ccm light hydrocarbon gas mixture flow at various catalyst temperatures

| | Temperature | Conversion, % | | | | | |
|---|---|---|---|---|---|---|---|
| TOS, h | °C. | Ethylene | Propene | Propane | Isobutane | 2-butene | Isobutylene |
| 0.8 | 450 | 69 | 73 | −26 | −80 | 94 | 97 |
| 1.9 | 450 | 64 | 68 | −15 | −88 | 93 | 96 |
| 4.0 | 505 | 61 | 70 | 49 | 70 | 95 | 97 |
| 6.2 | 478 | 4.3 | 3.6 | 2.2 | 3.7 | 24 | 48 |

Efficient conversion of light hydrocarbons to liquid hydrocarbons at about 500° C. is evident. Accordingly, stability of the Ga-ZSM-5 catalyst under these conditions was studied. A 5 ccm flow of the light hydrocarbon mixture was established at 500° C. and maintained for 4 hours. Results are summarized in Table 2.

TABLE 2

Stability of Ga-ZSM-5 (6.8% Ga loading) at 500° C., 5 ccm light hydrocarbon gas mixture flow at a catalyst bed temperature of 500° C. for 4 hours

| TOS, h | Conversion, % | | | | | |
|---|---|---|---|---|---|---|
| | Ethylene | Propene | Propane | Isobutane | 2-butene | Isobutylene |
| 0.4 | 86 | 94 | 91 | 100 | 100 | 100 |
| 1.9 | 75 | 87 | 81 | 90 | 100 | 100 |
| 4.0 | 52 | 73 | 42 | 96 | 99 | 99 |

All C4 hydrocarbon conversion rates remained high (i.e. >95%), while conversion rates of some other hydrocarbons decreased. For example, conversion of ethylene decreased to 52% and propene decreased to 73%. Propane conversion remained relatively unchanged at 42%. It is contemplated that in some embodiments light hydrocarbons will be recycled in an initial step that provides passage through a first catalyst that is effective in converting olefins (for example, a V-ZSM-5 catalyst) prior to exposure to a second catalyst that is effective in converting other light hydrocarbons species (e.g. a Ga-ZSM-5 catalyst), and that such processes are expected to provide good stability of the second catalyst.

Accordingly in some embodiments of the inventive concept, at least a portion of the light hydrocarbons produced in the catalytic reactor can be directed to a secondary catalyst bed. Such a secondary catalyst bed can have a different composition from that of a primary catalyst bed used for conversion of ethanol to hydrocarbon fuel species. For example, a secondary catalyst bed can include a zeolite catalyst that incorporates gallium (e.g. a gallium ZSM-5 catalyst). Reactions taking place at the secondary catalyst bed can convert light paraffins to desirable hydrocarbon fuel species, thereby increasing the overall efficiency of the ethanol conversion process.

In some embodiments of the inventive concept the secondary catalyst bed is operated at a temperature that differs from that of the primary catalyst bed. In a preferred embodiment, the secondary catalyst bed has an optimal operating temperature or temperature range that is higher than that of the primary catalyst bed. In such an embodiment the exothermic reaction taking place at the primary catalyst bed generates heat that elevates the temperature of the initial hydrocarbon mixture produced. Such a hydrocarbon mixture can have a temperature that is elevated relative to that of the primary catalyst bed, for example by 5° C., 10° C., 15° C., 20° C., 30° C., 40° C., 50° C., or more. This heated initial hydrocarbon mixture, or a portion thereof, can be used to heat or maintain the temperature of a secondary catalyst bed at an elevated temperature relative to the primary catalyst bed. In such an embodiment, the heated initial hydrocarbon mixture can heat or maintain the temperature of the secondary catalyst bed to a temperature range suitable for conversion of light hydrocarbons (for example C2, C3, and/or C4 hydrocarbons) to higher molecular weight fuel hydrocarbons. For example, where a primary catalyst bed for conversion of ethanol to fuel hydrocarbons can be operated within a temperature range of 350° C. to 420° C. and produces an initial hydrocarbon mixture having a temperature of about 450° C., a secondary catalyst bed for conversion of light paraffins to fuel hydrocarbons can be operated at around 450° C. or higher (for example, in a temperature range of 450° C. to 500° C.). In some embodiments the secondary catalyst bed can be provided in secondary catalytic reactor that is distinct from the primary catalytic reactor housing the primary catalyst bed. In other embodiments the secondary catalyst bed can be provided within the primary catalytic reactor. In some embodiments, heat transfer devices (for example heat pipes) can be utilized to transfer heat from the primary catalyst bed to the secondary catalyst bed, thereby cooling the primary catalyst bed while heating the secondary catalyst bed.

An example of a system of the inventive concept is shown schematically in FIG. 1. As shown, a source of alcohol (110) provides an alcohol stream (115) that is directed towards a primary catalyst bed (140). The primary catalyst bed (140) is configured to catalyze reactions that generate liquid hydrocarbon from the alcohol of the alcohol stream (115), which can be collected as a liquid hydrocarbon stream (160). The primary catalyst bed (140) functions optimally within a restricted temperature range. Surprisingly, Inventors have found that the temperature of the primary catalyst bed (140) can be conveniently controlled by controlling the water content of the alcohol stream (115). As shown, a source of water or water vapor (120) can be fluidically coupled to the alcohol feed stream (115) to provide water for temperature control of the primary catalyst bed (140). In a preferred embodiment the temperature of the primary catalyst bed (140) can be monitored, for example using a temperature probe (170), and temperature data provided to a controller (180). The controller (180) can, in turn, operate a flow control (130) that modulates amount of water or water vapor supplied from the water or water vapor source (120) to be mixed with the alcohol feed stream (115).

In some embodiments the primary catalyst bed (140) produces both liquid hydrocarbons and low molecular weight (e.g. C5 or less) hydrocarbons (e.g. paraffins). Such low molecular weight hydrocarbons are typically gases at ambient temperatures and pressures and are not generally suitable as vehicle fuels. In such embodiments low molecular weight hydrocarbons can be treated using a secondary catalyst bed (150) and catalytically converted to a higher molecular weight hydrocarbons that can be retrieved as a liquid hydrocarbon stream. (165). Such a secondary catalyst bed (150) can include a different catalyst than that utilized in the primary catalyst bed (140). Although depicted in FIG. 1 as a second catalytic reactor, it should be appreciated that in some embodiments the secondary catalyst bed (150) can be co-located (e.g. intermingled) or substantially co-located (e.g. within a common enclosure) with the primary catalyst bed (140).

In some embodiments at least a portion of the low molecular weight hydrocarbons produced by the primary catalyst bed can be diverted to and blended with the alcohol feed stream, thereby acting as a diluent for the alcohol feed stream. Such a stream of light hydrocarbon diluent can join the alcohol feed stream upstream or downstream of the point at which water or a water-containing fluid enters. In such embodiments the flow of such light hydrocarbon diluent is controlled by a flow control device, which can be in communication with a controller that receives data related to the temperature of the primary catalyst bed.

In other embodiments of the inventive process, an alcohol feed stream being utilized for conversion to liquid hydrocarbons can be heated prior to contacting a catalyst bed. In some embodiments the alcohol feed stream is heated to the operating temperature of a catalyst bed to which it is to be applied. In other embodiments the alcohol feed stream is heated to a temperature that is below the operating temperature of a catalyst bed to which it is to be applied. Examples of systems of the inventive concept that incorporate such a pre-heating feature are shown schematically in FIG. 2A and FIG. 2B.

Figure 2A:
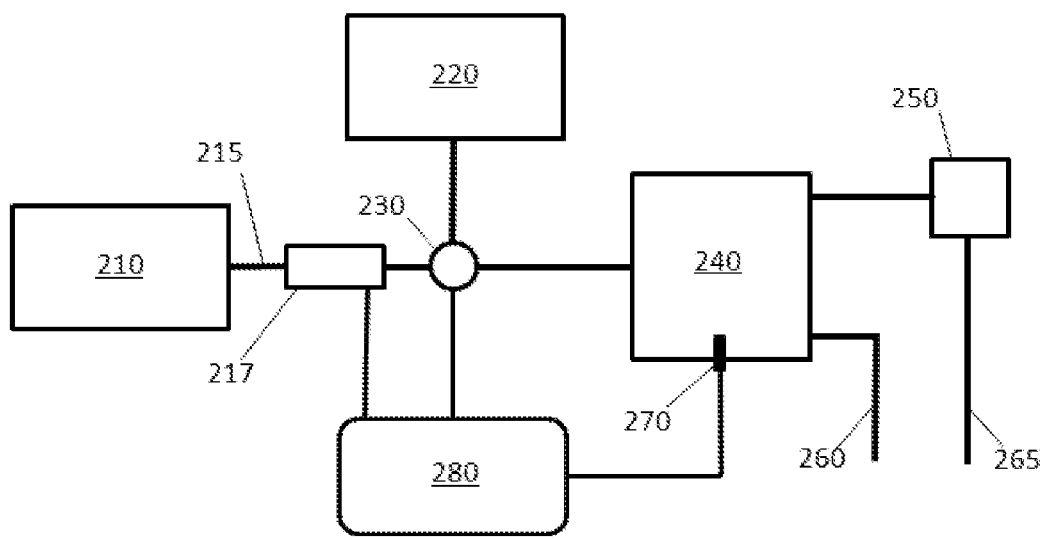
FIGS. 2A and 2B schematically depicts systems of the inventive concept in which the temperature of the alcohol feedstream is modulated prior to being introduced to a catalyst bed in a catalytic process for conversion of alcohol to liquid fuel hydrocarbons.

FIG. 2A schematically depicts a system of the inventive concept that pre-heats an alcohol feed stream using a dedicated heater. As shown, a source of alcohol (210) provides an alcohol stream (215) that is directed towards a primary catalyst bed (240) after passing through a heater (217). The primary catalyst bed (240) is configured to catalyze reactions that generate liquid hydrocarbon from the alcohol of the alcohol stream (215), which can be collected as a liquid hydrocarbon stream (260). The primary catalyst bed (240) functions optimally within a restricted temperature range. Surprisingly, Inventors have found that the temperature of the primary catalyst bed (240) can be conveniently controlled by controlling the water content of the alcohol stream (215). As shown, a source of water or water vapor (220) can be fluidically coupled to the alcohol feed stream (215) to provide water for temperature control of the primary catalyst bed (240). The temperature of the primary catalyst bed can also be controlled by modulating the amount of heat energy supplied by the heater (217). In a preferred embodiment the temperature of the primary catalyst bed (240) can be monitored, for example using a temperature probe (270), and temperature data provided to a controller (280). The controller (280) can, in turn, operate a flow control (230) that modulates amount of water or water vapor supplied from the water or water vapor source (220) to be mixed with the alcohol feed stream (215). In some embodiments the controller (280) can modulate the amount of heat energy supplied by the heater (217), for example by controlling the heat output of the heater (217) and/or the flow rate through it. Such a heater can be powered by any suitable means, such as electrical power (e.g. a resistance heater), burning of fuel from an outside source (e.g. natural gas), and/or burning of reaction products produced by the system.

In some embodiments the primary catalyst bed (240) produces both liquid hydrocarbons and low molecular weight (e.g. C5 or less) hydrocarbons (e.g. paraffins). Such low molecular weight hydrocarbons are typically gases at ambient temperatures and pressures and are not generally suitable as vehicle fuels. In such embodiments low molecular weight hydrocarbons can be treated using a secondary catalyst bed (250) and catalytically converted to a higher molecular weight hydrocarbons that can be retrieved as a liquid hydrocarbon stream (265). Such a secondary catalyst bed (150) can include a different catalyst than that utilized in the primary catalyst bed (240). Although depicted in FIG. 2A and FIG. 2B as a second catalytic reactor, it should be appreciated that in some embodiments the secondary catalyst bed (250) can be co-located (e.g. intermingled) or substantially co-located (e.g. within a common enclosure) with the primary catalyst bed (240). In some embodiments, all or a portion of the low molecular weight hydrocarbons can be utilized as fuel for the heater (217).

In some embodiments at least a portion of the low molecular weight hydrocarbons produced by the primary catalyst bed can be diverted to and blended with the alcohol feed stream, thereby acting as a diluent for the alcohol feed stream. Such a stream of light hydrocarbon diluent can join the alcohol feed stream upstream or downstream of the point at which water or a water-containing fluid enters. In such embodiments the flow of such light hydrocarbon diluent is controlled by a flow control device, which can be in communication with a controller that receives data related to the temperature of the primary catalyst bed.

Figure 2B:
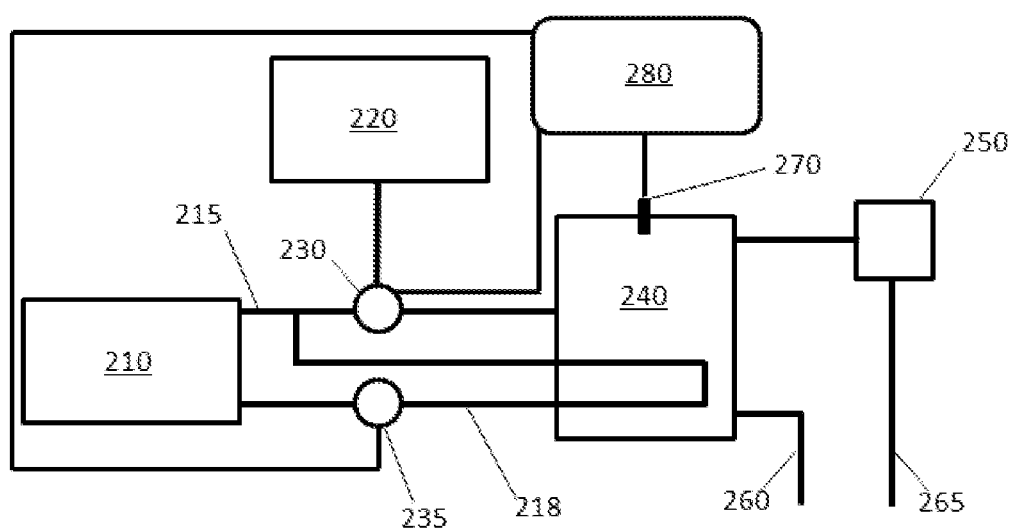

FIG. 2B depicts an alternative embodiment of a system that provides pre-heating of the alcohol feed stream by routing a portion of the alcohol feed stream through a heat-exchanger that is in thermal contact with a catalyst bed. Such an arrangement advantageously takes advantage of the exothermic nature of the conversion of alcohol to liquid hydrocarbons, and provides an additional means to control the temperature of the catalyst bed by simultaneously heating the alcohol feedstream and cooling the catalyst bed within which it is in thermal contact. As shown, a source of alcohol (210) provides multiple alcohol streams. One of these is an alcohol stream (215) that is directed towards a primary catalyst bed (240). The primary catalyst bed (240) is configured to catalyze reactions that generate liquid hydrocarbon from the alcohol of the alcohol stream (215), which can be collected as a liquid hydrocarbon stream (260). The primary catalyst bed (240) functions optimally within a restricted temperature range. Surprisingly, Inventors have found that the temperature of the primary catalyst bed (240) can be conveniently controlled by controlling the water content of the alcohol stream (215). As shown, a source of water or water vapor (220) can be fluidically coupled to the alcohol feed stream (215) to provide water for temperature control of the primary catalyst bed (240). Another alcohol stream is directed through a closed loop or heat exchanger (218) that is in thermal contact with the primary catalyst bed (240). At least a portion of the heat provided by the exothermic conversion of alcohol to liquid hydrocarbons is transferred through this closed loop or heat exchanger (218), which can join another alcohol feed stream (215) prior to contact with the primary catalyst bed (240). Although depicted as joining alcohol feed stream 215 upstream of the water/water vapor flow control (230), it should be appreciated that the alcohol stream from the closed loop or heat exchanger (218) can join alcohol feed stream 215 downstream of the water/water vapor flow control (230) and or can be directed to the primary catalyst bed (240) without joining alcohol feed stream 215.

The temperature of the primary catalyst bed can also be controlled by modulating the amount of water added to the alcohol feed stream (215) and/or the amount of heat energy supplied by the closed loop or heat exchanger (218). In a preferred embodiment the temperature of the primary catalyst bed (240) can be monitored, for example using a temperature probe (270), and temperature data provided to a controller (280). The controller (280) can, in turn, operate a flow control (230) that modulates amount of water or water vapor supplied from the water or water vapor source (220) to be mixed with the alcohol feed stream (215). In some embodiments the controller (280) can modulate the amount of heat energy supplied by the closed loop or heat exchanger (218), for example by operating a flow control (235) that modulates the flow rate of alcohol through the closed loop or heat exchanger (218) through it. In some embodiments, a system of the inventive concept can utilize both an external heater (217) and a closed loop/heat exchanger (218) in thermal communication with the primary catalyst bed (240) to heat an alcohol stream to be processed into liquid hydrocarbons.

In some embodiments the primary catalyst bed (240) produces both liquid hydrocarbons and low molecular weight (e.g. C5 or less) hydrocarbons (e.g. paraffins). Such low molecular weight hydrocarbons are typically gases at ambient temperatures and pressures and are not generally suitable as vehicle fuels. In such embodiments low molecular weight hydrocarbons can be treated using a secondary catalyst bed (250) and catalytically converted to a higher molecular weight hydrocarbons that can be retrieved as a liquid hydrocarbon stream (265). Such a secondary catalyst bed (150) can include a different catalyst than that utilized in the primary catalyst bed (240). Although depicted in FIG. 2A and FIG. 2B as a second catalytic reactor, it should be appreciated that in some embodiments the secondary catalyst bed (250) can be co-located (e.g. intermingled) or substantially co-located (e.g. within a common enclosure) with the primary catalyst bed (240). In some embodiments, all or a portion of the low molecular weight hydrocarbons can be utilized as fuel for the heater (217).

In some embodiments at least a portion of the low molecular weight hydrocarbons produced by the primary catalyst bed can be diverted to and blended with the alcohol feed stream, thereby acting as a diluent for the alcohol feed stream. Such a stream of light hydrocarbon diluent can join the alcohol feed stream upstream or downstream of the point at which water or a water-containing fluid enters. In such embodiments the flow of such light hydrocarbon diluent is controlled by a flow control device, which can be in communication with a controller that receives data related to the temperature of the primary catalyst bed.

It should be appreciated that, unlike traditional ZSM-5 catalysts, the catalysts utilized in the above processes are tolerant to substantial amounts of water in the alcohol raw material at elevated temperatures and/or pressures. In embodiments of the inventive concept the catalyst does not undergo nonreversible inactivation following 50, 100, 150, 200, or more than 200 cycles of use. In some embodiments the catalyst does not show significant (i.e., greater than 10%) inactivation under such conditions. In other embodiments, the catalyst shows a reversible inactivation and can be regenerated without significant loss of activity.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method for controlling temperature in a catalyst bed comprising:
    providing a catalyst bed configured to process alcohol to a fuel hydrocarbon mixture;
    providing a first flow of a first stream comprising the alcohol;
    directing a second flow of a second stream comprising water into the first stream to produce a third stream, wherein the third stream is directed to the catalyst bed; and
    modulating the first flow or the second flow to modulate water content of the third stream to maintain temperature of the catalyst bed within a desired temperature range, wherein a mean temperature within the desired temperature range is from 200° C. to 600° C., and wherein the mean temperature is surrounded by a temperature range selected from the group consisting of ±20° C., ±30° C., ±40° C., ±50° C., ±60° C., ±70° C., ±80° C., ±90° C., and ±100° C.

2. The method of claim 1, further comprising the step of generating temperature data characterizing temperature of the catalyst bed.

3. The method of claim 2, further comprising the steps of:
    providing the temperature data to a controller;
    within the controller, using an algorithm to determine a flow rate of either the first flow or the second flow necessary to maintain temperature of the catalyst bed within a desired range; and
    transmitting an instruction from the controller to a flow control device to modulate flow rate of either the first flow or the second flow.

4. A method for controlling temperature in a catalyst bed, comprising:
    providing a catalyst bed configured to process alcohol to a fuel hydrocarbon mixture, wherein the catalyst bed is at a first temperature;
    providing a flow of an alcohol stream at a second temperature that is below the first temperature, wherein the flow is divided into a first flow path and a second flow path, wherein the first flow path is heated to a third temperature and is directed to the catalyst bed, and wherein the second flow path is provided as a passage that is in thermal communication with the catalyst bed; and
    modulating flow through the second flow path to maintain temperature of the catalyst bed within a desired temperature range, wherein the desired temperature range has a mean temperature of 200° C. to 600° C., and wherein the mean temperature is surrounded by a temperature range selected from the group consisting of ±20° C., ±30° C., ±40° C., ±50° C., ±60° C., ±70° C., ±80° C., ±90° C., and ±100° C.

5. The method of claim 4, wherein the third temperature is within the desired temperature range.

6. The method of claim 4, further comprising the step of generating temperature data characterizing temperature of the catalyst bed.

7. The method of claim 6, further comprising the steps of:
    providing the temperature data to a controller;
    within the controller, using an algorithm to determine a flow rate of either the first flow path or the second flow path necessary to maintain temperature of the catalyst bed within a desired range; and
    transmitting an instruction from the controller to a flow control device to modulate flow rate of either the first flow path or the second flow path.

* * * * *